United States Patent [19]

Arashiro et al.

[11] Patent Number: 5,360,866
[45] Date of Patent: Nov. 1, 1994

[54] THERMOPLASTIC POLYPHENYLENE ETHER RESIN COMPOSITION

[75] Inventors: Yusuke Arashiro; Michiharu Kihara; Haruo Ohmura; Fumiyoshi Yamada, all of Mie, Japan

[73] Assignee: Mitsubishi Petrochemical Co., Ltd., Tokyo, Japan

[21] Appl. No.: 49,599

[22] Filed: Apr. 20, 1993

Related U.S. Application Data

[62] Division of Ser. No. 732,004, Jul. 18, 1991, Pat. No. 5,244,983.

[30] Foreign Application Priority Data

| Jul. 20, 1990 | [JP] | Japan | 2-190433 |
| Jul. 20, 1990 | [JP] | Japan | 2-190434 |
| Sep. 17, 1990 | [JP] | Japan | 2-268289 |
| Oct. 18, 1990 | [JP] | Japan | 2-277706 |

[51] Int. Cl.$^5$ .................. C08F 255/02; C08L 71/12
[52] U.S. Cl. ........................... 525/68; 525/396
[58] Field of Search ..................... 525/68, 396

[56] References Cited

U.S. PATENT DOCUMENTS

| 4,816,515 | 3/1989 | Weiss | 525/68 |
| 5,015,698 | 5/1991 | Sybert et al. | 525/396 |
| 5,128,421 | 7/1992 | Ohmura et al. | 525/396 |
| 5,177,156 | 1/1993 | Aritomi et al. | 525/396 |

FOREIGN PATENT DOCUMENTS

| 0184149 | 6/1986 | European Pat. Off. |
| 0268486 | 5/1988 | European Pat. Off. |
| 0319339 | 6/1989 | European Pat. Off. |
| 0446682 | 9/1991 | European Pat. Off. |
| 0457351 | 11/1991 | European Pat. Off. |

OTHER PUBLICATIONS

Patent Abstracts of Japan, vol. 12, No. 373, Oct. 6, 1988 (JP-A-63-128021).

Primary Examiner—James J. Seidleck
Assistant Examiner—Thomas Hamilton, III
Attorney, Agent, or Firm—Sughrue, Mion, Zinn, Macpeak & Seas

[57] ABSTRACT

A thermoplastic resin composition comprising (A) from about 10 to about 90% by weight of a hydroxyalkylated polyphenylene ether represented by formula (I):

$$A-O+CH_2CH-CH_2O\!\!\mid_{\overline{n}}\!H \qquad (I)$$
$$\mid$$
$$OH$$

wherein A represents a residue of a polyphenylene ether from which a hydroxyl group is removed; and n represents an integer of from 1 to 10, and (B) from about 10 to about 90% by weight of a resin selected from a carboxyl-containing olefin resin, an epoxy-containing olefin resin, a hydroxyl-containing olefin resin, a polyamide resin, and a saturated polyester resin, provided that when (B) is the olefin resin, the hydroxyalkylated polyphenylene ether also can be represented by formula (II):

$$AO-CH_2CHCH_2-X+R^1-Si+OR^2)_t\!\!\mid_s \qquad (II)$$
$$\mid \qquad \qquad \mid$$
$$OH \qquad (R^3)_{3-t}$$

wherein A is defined as above; X represents an oxygen atom or a nitrogen atom; $R^1$ represents an alkylene group having from 1 to 12 carbon atoms; $R^2$ and $R^3$ each represents a hydrocarbon group having from 1 to 6 carbon atoms; s represents 1 when X is an oxygen atom, or 2 when X is a nitrogen atom; and t represents an integer of from 1 to 3.

3 Claims, No Drawings

THERMOPLASTIC POLYPHENYLENE ETHER RESIN COMPOSITION

This is a divisional of application Ser. No. 07/732,004 filed Jul. 18, 1991 U.S. Pat. No. 5,244,983.

FIELD OF THE INVENTION

This invention relates to a polyphenylene ether resin composition excellent in organic solvent resistance and mechanical strength. More particularly, it relates to a resin composition comprising (A) a hydroxyalkylated polyphenylene ether resin and (B) a thermoplastic resin selected from an olefin resin having a specific functional group, a polyamide resin, and a saturated polyester resin.

The composition has properties characteristic of phenylene ether resins, i.e., heat resistance and mechanical strength combined with properties characteristic of olefin resins, i.e., moldability and organic solvent resistance, or properties characteristic of polyamide resins or saturated polyester resins, i.e., heat resistance, oil resistance, and moldability and is therefore widely useful as engineering plastics for machine parts, e.g., gears and cranks, automobile parts, e.g., an ignition manifold, and electric parts, e.g., switch sealants.

BACKGROUND OF THE INVENTION

Polyphenylene ether resins (hereinafter referred to as PPE) are useful as molding resins because of their excellent thermal, mechanical and electrical properties, but the range of their utility is limited due to insufficiency in moldability, organic solvent resistance, and impact resistance. Incorporation of other resins with PPE has been proposed to overcome these disadvantages. For example, U.S. Pat. No. 3,383,435 suggests improving moldability of PPE by incorporation of a styrene polymer, but improvement in organic solvent resistance is not achieved.

Studies have also been made on various blends of PPE and olefin resins having excellent organic solvent resistance. For example, JP-B-42-7069 (the term "JP-B" as used herein means an "examined published Japanese patent application") proposes a blend of an olefin resin and PPE, but the blend does not always reach high standards of organic solvent resistance and mechanical strength as demanded in industry.

Compounding, for example, a styrene-butadiene block copolymer or a hydrogenation product thereof with a blend of PPE and an olefin resin for the purpose of improving compatibility between these two resin components has been proposed as disclosed in JP-A-53-71158 (U.S. Pat. No. 4,145,377), JP-A-54-88960, U.S. Pat. No. 4,166,055, U.S. Pat. No. 4,239,673, JP-A-59-100159, and EP-A-115712 (the term "JP-A" as used herein means an "unexamined published Japanese patent application"). In the compositions proposed, however, since the proportion of the olefin resin is small and PPE substantially forms a continuous phase, organic solvent resistance possessed by olefin resins is not sufficiently manifested.

JP-A-58-103557 (U.S. Pat. No. 4,383,082) and JP-A-60-76547 (EP-A-133487) disclose PPE resin compositions containing at least 20% by weight of an olefin resin and a compatibilizer, for example, a di-block copolymer of an alkenyl aromatic compound and a conjugated diene or a hydrogenation product thereof. Although these compositions exhibit improved tensile characteristics and non-brittleness, they do not sufficiently achieve required levels of rigidity and heat resistance.

JP-A-63-128021 discloses a PPE resin composition comprising (a) an alcoholic hydroxyl-modified PPE obtained by addition of ethylene oxide to PPE, (b) a maleic anhydride-modified styrene-grafted polyolefin, (c) unmodified PPE, and (d) polypropylene. However, it is difficult to prepare OH-modified PPE copolymer (a) with constant properties by addition of ethylene oxide, and molded articles obtained from the resulting resin composition have reduced strength.

Further, incorporation of a polyamide resin with PPE has been proposed to provide various compositions in which the disadvantages of the two resins are compensated for by each other while retaining their own advantages. For example, compositions prepared by merely mixing these two resin components in a molten state are disclosed in U.S. Pat. No. 3,379,792, JP-B-45-997, U.S. Pat. No. 4,338,421, and JP-B-59-41663. However, since PPE is essentially incompatible with polyamides, such a mere polymer blend undergoes phase separation on molding due to poor interfacial affinity, failing to have excellent mechanical strength.

Methods proposed to date for improving compatibility between polyamide resins and PPE include compounding a compound having a carbon-carbon double bond and any of a carboxyl group, an acid anhydride group, an acid amide group, an imido group, a carboxylic ester group, an epoxy group, an amino group, and a hydroxyl group in the molecule thereof as disclosed, e.g., in JP-A-56-26913; compounding a liquid diene polymer as disclosed, e.g., in JP-A-57-10642; compounding a compound having an oxirane ring in the molecule thereof and/or a condensed high polymer obtained from a dihydric phenol and epichlorohydrin as disclosed, e.g., in JP-A-56-47432 (above fore JP-A No. incorporated in U.S. Pat. No. 4,315,066); compounding an organic phosphoric ester as disclosed, e.g., in JP-A-60-58463 (EP-A-129825); and compounding a compound having a carbon-silicon bond, either one of a halogen atom and an alkoxy group, and any one of an alkyl group, a vinyl group, an acrylic group, a methacrylic group, an amino group, an epoxy group, and a mercapto group in the molecule thereof as disclosed in JP-A-62-232455 and JP-B-59-33614 (U.S. Pat. No. 4,339,376).

These methods aim toward the improvement in compatibility through activation of the terminal phenolic hydroxyl group or the methyl group in the side chain of PPE by melt-kneading in the presence of a third component. However, because the terminal phenolic hydroxyl group or the methyl group in the side chain of PPE essentially has limited reactivity, these methods often fail to sufficiently improve compatibility of PPE with polyamide resins. Besides, the third component added remains unreacted in the resulting modified PPE, which causes unfavorable problems such as poor appearance of molded articles due to volatilization of such an unreacted substance during molding and color instability due to deteriorated hue of the molded articles. In addition, the resulting resin compositions are still insufficient in mechanical strength.

Furthermore, it is known to incorporate saturated polyester resins into PPE as disclosed, e.g., in JP-B-51-21664, JP-A-49-50050, JP-A-49-75662, and JP-A-59-159847. However, in such mere blends having a two-phase structure, the affinity in the interface between the two phases of PPE and a saturated polyester resin is insufficient due to poor compatibility so that the two phases hardly form a uniform and fine dispersion. Such a polymer blend is apt to undergo delamination under a shearing stress on molding, such as injection molding, and the resulting molded articles have a deteriorated appearance or suffer from defects in the interface of two phases. Therefore, a composition excellent in mechanical characteristics, e.g., dimensional precision, heat resistance and rigidity, and physical characteristics, e.g., solvent resistance, cannot be obtained.

Approaches proposed to date for improving compatibility between PPE and saturated polyester resins include a method of using a modified PPE obtained by reacting PPE with a compound containing a carbon-carbon double bond or a carbon-carbon triple bond and at least one of a carboxyl group, an acid anhydride group, an acid amide group, an epoxy group, a hydroxyl group, etc. as disclosed in JP-A-62-257958, JP-A-63-54427 (U.S. Pat. Nos. 4,755,566 and 4,889,889), and JP-W-63-500803 (WO-A-8700540) (the term "JP-W" as used herein means an "unexamined published international patent application"); a method of using an alkoxysilyl-modified PPE as disclosed in JP-W-63-503392 (WO-A-8707279); a method of using an oxazoline-modified PPE as disclosed in JP-A-2-187453; a method of using a polyester modified with hydroxyl- or carboxyl-terminated polystyrene as disclosed in JP-A-2-170852 (EP-A-365841); a method of compounding a hydroxycarboxylic acid as disclosed in JP-A-2-129259 (EP-A-368283); a method of using a hydroxyalkylated PPE obtained by reacting PPE with a bis(hydroxyalkyl) maleate, which is melt-kneaded with polybutylene terephthalate as disclosed in U.S. Pat. No. 4,746,708 and WO 87/07279; and a method of using a hydroxyalkylated PPE obtained by reacting PPE with terephthaloyl chloride and then reacting the product with a diol, which is melt-kneaded with polybutylene terephthalate as disclosed in U.S. Pat. No. 4,746,708 and WO 87/07279. In many cases, however, these techniques are still unsatisfactory for improving compatibility between PPE and saturated polyester resins, and the resulting resin compositions do not have sufficient mechanical characteristics and still need further improvements.

SUMMARY OF THE INVENTION

The inventors have found that (A) a specific hydroxyalkylated PPE and (B) an olefin resin having a specific functional group, a polyamide resin, or a saturated polyester resin exhibit excellent compatibility with each other to provide a molded article having excellent resistance to heat and solvents and satisfactory hue, and thus have attained the present invention. These and other objects and advantages can be obtained by any one of three embodiments of the present invention set forth below.

A first embodiment of the present invention is a thermoplastic resin composition comprising (A) from about 10 to about 90% by weight of a hydroxyalkylated PPE represented by formula (I) or (II):

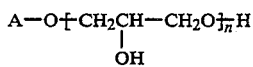  (I)

-continued

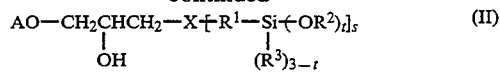  (II)

wherein A represents a residue of a polyphenylene ether from which a hydroxyl group is removed; n represents an integer of from 1 to 10; X represents an oxygen atom or a nitrogen atom; $R^1$ represents an alkylene group having from 1 to 12 carbon atoms; $R^2$ and $R^3$ each represents a hydrocarbon group having from 1 to 6 carbon atoms; s represents 1 when X is an oxygen atom, or 2 when X is a nitrogen atom; and t represents an integer of from 1 to 3, and (B) from about 10 to about 90% by weight of an olefin resin selected from a carboxyl-containing olefin resin, an epoxy-containing olefin resin, and a hydroxyl-containing olefin resin.

A second embodiment of the present invention is a thermoplastic resin composition comprising (A) from about 10 to about 90% by weight of a hydroxyalkylated PPE represented by formula (I) as defined above, and (B) from about 10 to about 90% by weight of a polyamide resin.

A third embodiment of the present invention is a thermoplastic resin composition comprising (A) from about 10 to about 90% by weight of the hydroxyalkylated PPE represented by formula (I) as defined above, and (B) from about 10 to about 90% by weight of a saturated polyester resin.

In the above embodiments of the present invention, the % by weight for (A) and (B) are based on the weight of the resin composition.

DETAILED DESCRIPTION OF THE INVENTION

Hydroxyalkylated PPE represented by formula (I) which can be used as component (A) in the present invention is a PPE whose terminal group is functionalized by addition of an alcoholic hydroxyl group to the terminal phenolic hydroxyl group. Hydroxyalkylated PPE of the invention can be prepared according to the following processes (a) or (b) by starting with a PPE represented by formula (V):

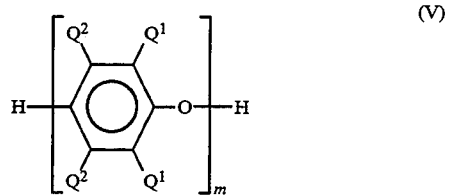  (V)

wherein $Q^1$ represents a halogen atom, a primary or secondary alkyl group, a phenyl group, an aminoalkyl group, a hydrocarbon oxy group, or a halo-hydrocarbon oxy group; $Q^2$ represents a hydrogen atom, a halogen atom, a primary or secondary alkyl group, a phenyl group, a haloalkyl group, a hydrocarbon oxy group, or a halo-hydrocarbon oxy group; and m represents an integer of 10 or greater.

Process (a) comprises reacting PPE of formula (V) with glycidol represented by formula:

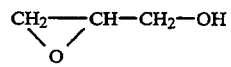

to prepare hydroxyalkylated PPE represented by formula (VI):

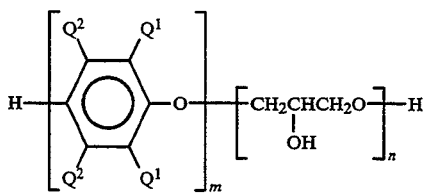

wherein $Q^1$, $Q^2$, and m are as defined in formula (V) and n is as defined in formula (I).

Process (b) comprises reacting PPE of formula (V) with an epihalohydrin represented by formula:

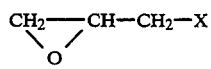

wherein X represents a halogen atom, e.g., epichlorohydrin, and hydrolyzing the resulting glycidyl-terminated modified PPE to prepare hydroxyalkylated PPE represented by formula (VII):

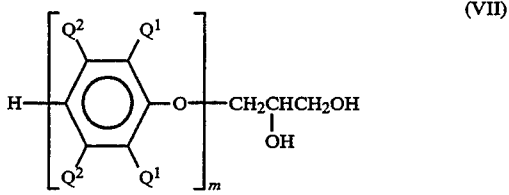

wherein $Q^1$, $Q^2$, and m are as defined above.

The starting PPE of formula (V) includes homopolymers and copolymers comprising formula (V).

Examples of suitable primary alkyl groups as represented by $Q^1$ or $Q^2$ are methyl, ethyl, n-propyl, n-butyl, n-amyl, isoamyl, 2-methylbutyl, n-hexyl, 2,3-dimethylbutyl, 2-, 3- or 4-methylpentyl, and heptyl groups. Examples of suitable secondary alkyl groups as $Q^1$ or $Q^2$ are isopropyl, sec-butyl, and 1-ethylpropyl groups. $Q^1$ is preferably an alkyl group or a phenyl group and, more preferably, an alkyl group having from 1 to 4 carbon atoms. $Q^2$ is preferably a hydrogen atom.

Suitable PPE homopolymers include a homopolymer comprising a 2,6-dimethyl-1,4-phenylene ether unit. Suitable phenylene ether copolymers include a random copolymer comprising a 2,6-dimethyl-1,4-phenylene ether unit and a 2,3,6-trimethyl-1,4-phenylene ether unit. Many examples of suitable PPE homopolymers or PPE random copolymers are described in patents and literature (e.g., in WO87/07279). PPE containing a molecular segment for improving such characteristics as molecular weight, melt viscosity and/or impact strength are also suitable (e.g., JP-B-63-60059).

PPE used here preferably has a molecular weight so as to have an intrinsic viscosity of from about 0.2 to about 0.8 dl/g in chloroform at 30° C.

PPE is generally prepared by oxidative coupling of the above-mentioned phenylene ether monomer(s). A number of catalyst systems are known for use in oxidative coupling of phenylene ether monomers. Any known catalysts can be used in the present invention without any particular limitation. For example, combinations of at least one heavy metal compound of copper, manganese, cobalt, etc. with various other substances are used.

In the preparation of the hydroxyalkylated PPE of formula (I), the reaction between PPE and glycidol or epihalohydrin is carried out in an organic solvent in the presence of a basic catalyst.

Examples of suitable organic solvents are aromatic hydrocarbons, e.g., benzene, toluene, and xylene; halogenated hydrocarbons, e.g., chloroform and carbon tetrachloride; halogenated aromatic hydrocarbons, e.g., chlorobenzene and dichlorobenzene; and heterocyclic compounds, e.g., N-methyl-2-pyrrolidone and 1,3-dimethyl-2-imidazolidinone.

Examples of suitable basic catalysts include alcoholates, e.g., sodium methoxide and sodium ethoxide; alkali metal hydroxides, e.g., sodium hydroxide and potassium hydroxide; and alkali metal carbonates, e.g., sodium carbonate and potassium carbonate.

Glycidol or epihalohydrin is used in an amount of from 1 to 50 mols per mol of the terminal phenolic hydroxyl group of PPE. The basic catalyst is used in an amount of from 0.5 to 50 parts by weight per 100 parts by weight of PPE.

A process for producing a terminal-modified PPE represented by formula (II) is obtained by reacting polyphenylene ether represented by formula (V) with a compound containing an alkoxysilyl group and a glycidyl group per molecule which is represented by formula (VIII):

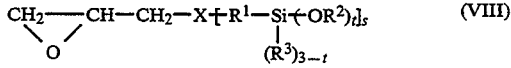

wherein X, $R^1$, $R^2$, $R^3$, s, and t are as defined above, to produce a terminal-modified PPE of formula (II).

Component (B) is selected from (b-1) an olefin resin containing a carboxyl group, (b-2) an olefin resin containing an epoxy group, (b-3) an olefin resin containing a hydroxyl group, (b-4) a polyamide resin, and (b-5) a saturated polyester resin. These resins contain an epoxy group or a hydroxyl group compatible with the hydroxyl group of hydroxyalkylated PPE or a carboxyl group (—COOH) reactive with the hydroxyl group of hydroxyalkylated PPE.

Carboxyl-containing olefin resin (b-1) can be prepared by, for example, (i) a process comprising random-, block- or graft-copolymerization of a carboxyl-containing polymerizable monomer, (ii) a process comprising reacting a functional group of an olefin resin with a compound containing a carboxyl group or a compound capable of forming a carboxyl group, or (iii) a process comprising modification of an olefin resin by oxidation, hydrolysis, etc. In particular, a process utilizing copolymerization and a process utilizing hydrolysis or pyrolysis are favorable for the ease of introduction of a carboxyl group and control of the introduced amount of a carboxyl group.

The carboxyl-containing polymerizable monomer includes acrylic acid, methacrylic acid, maleic acid, itaconic acid, himic acid, and anhydrides of these acids, with acrylic acid and maleic anhydride being preferred.

Olefin resins which can be used for the preparation of olefin resins from (b-1) to (b-3) suitable for the present invention include homopolymers of an α-olefin, e.g., ethylene, propylene, butene-1, pentene-1, hexene-1,3-methylbutene-1,4-methylpentene-1, heptene-1, and octene-1; copolymers comprising two or more of these α-olefins; and unsaturated copolymers comprising an α-olefin having from 2 to 12 carbon atoms, and preferably from 2 to 8 carbon atoms, and from about 0.05 to about 50 mol %, and preferably from 0.1 to 30 mol %, of an acyclic non-conjugated diene represented by formula (IV):

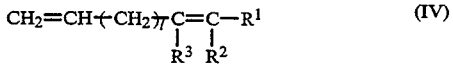  (IV)

wherein l represents an integer of from 1 to 10; $R^1$, $R^2$, and $R^3$ each represents a hydrogen atom or an alkyl group having not more than 8 carbon atoms, provided that $R^1$, $R^2$, and $R^3$ do not simultaneously represent hydrogen atoms.

Specific examples of the olefin resins are the above-described specific unsaturated copolymers, low-density polyethylene, middle-density polyethylene, high-density polyethylene, polypropylene, and propylene-ethylene copolymers, with the unsaturated copolymers being particularly preferred.

The unsaturation of the above-mentioned unsaturated copolymer comprising an α-olefin and a specific acyclic non-conjugated diene of formula (IV) is considered to be attributed to the moiety

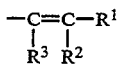

which is pendant from the copolymer chain via an alkylene group without participating in copolymerization with the α-olefin.

The unsaturated copolymer has crystallinity preferably of 10% or higher, and more preferably 20% or higher, as determined by X-ray analysis.

The unsaturated copolymer may further contain other comonomer units in a minor proportion, usually up to about 15 mol % based on the sum of the α-olefin and the non-conjugated diene.

The unsaturated copolymer preferably has a number average molecular weight of more than 3,000 and a melting point of about 40° C. or higher.

Specific examples of the α-olefin included in the unsaturated copolymer are ethylene, propylene, 1-butene, lhexene, 3-methyl-1-butene, 3-methyl-1-pentene, 4-methyl-1-pentene, 3,3-dimethyl-1-butene, 4,4-dimethyl-1-pentene, 3-methyl-1-hexene, 4-methyl-1-hexene, 4,4-dimethyl-1-hexene, 5-methyl-1-hexene, allylcyclopentane, allylcyclohexane, allylbenzene, 3-cyclohexyl-1-butene, vinylcyclopropane, vinylcyclohexane, and 2-vinylbicyclo[2,2,1]-heptane. Preferred are ethylene, propylene, 1-butene, 1-hexene, 3-methyl-1-butene, 3-methyl-1-pentene, 4-methyl-1-pentene, and 3-methyl-1-hexene. Particularly preferred are ethylene, propylene, 1-butene, 3-methyl-1-butene, and 4-methyl-1-pentene.

These α-olefins may be used either individually or in combination of two or more thereof. When 1-hexene is used, in particular, it is preferably combined with at least one of ethylene, propylene, 1-butene, 4-methyl-1-pentene, and 3-methyl-1-butene. If two or more α-olefins are used in combination, they may be distributed among the unsaturated copolymer at random or in blocks.

In formula (IV) for the acyclic non-conjugated diene, l is preferably from 1 to 5, and the alkyl group as $R^1$, $R^2$ or $R^3$ preferably contains from 1 to 4 carbon atoms. More preferably, l is from 1 to 3; $R^1$ is an alkyl group having from 1 to 3 carbon atoms; and $R^2$ and $R^3$ each represents a hydrogen atom or an alkyl group having from 1 to 3 carbon atoms, provided that $R^2$ and $R^3$ do not simultaneously represent a hydrogen atom.

Examples of suitable acyclic non-conjugated dienes include (i) acyclic 1,4-dienes, e.g., 2-methyl-1,4-pentadiene, 4-methylidene-1-hexene, 1,4-hexadiene, 4-methyl-1,4-hexadiene, 5-methyl-1,4-hexadiene, 1,4-heptadiene, 4-ethyl-1,4-hexadiene, 4,5-dimethyl-1,4-hexadiene, 4-methyl-1,4-heptadiene, 4-ethyl-1,4-heptadiene, 5-methyl-1,4-heptadiene, and 5-methyl-1,4-octadiene; (ii) acyclic 1,5-dienes, e.g., 1,5-heptadiene, 1,5-octadiene, 5-methyl-1,5-heptadiene, 6-methyl-1,5-heptadiene, and 2-methyl-1,5-hexadiene; (iii) acyclic 1,6-dienes, e.g., 1,6-octadiene, 6-methyl-1,6-octadiene, 7-methyl-1,6-octadiene, 2-methyl-1,6-heptadiene, 6-methylidene-1-octene, 6-ethyl-1,6-octadiene, 6,7-dimethyl-1,6-octadiene, 1,6-nonadiene, 6-ethyl-1,6-nonadiene, 7-methyl-1,6-nonadiene, and 7-methyl-1,6-decadiene; (iv) acyclic 1,7-dienes, e.g., 1,7-nonadiene, 7-methyl-1,7-nonadiene, 8-methyl-1,7-nonadiene, and 2-methyl-1,7-octadiene; and (v) acyclic 1,8-dienes, e.g., 8-methyl-1,8-decadiene and 9-methyl-1,8-decadiene.

Preferred are 4-methyl-1,4-hexadiene, 5-methyl-1,4-hexadiene, and 7-methyl-1,6-octadiene.

These non-conjugated dienes may be used either individually or in combination of two or more thereof. A preferred example of the combination is 4-methyl-1,4-hexadiene and 5-methyl-1,4-hexadiene at a weight ratio of from 95:5 to 5:95.

The unsaturated copolymer can be prepared by copolymerizing the above-described α-olefin and acyclic non-conjugated diene in the presence of a Ziegler-Natta catalyst for α-olefin polymerization with the same apparatus and under the same conditions as in α-olefin polymerization. For details, reference can be made to JP-A-55-165907, JP-A-56-30414, JP-A-56-36508, and JP-A-57-155206.

The acyclic non-conjugated dienes may be distributed in the unsaturated copolymer either at random or in blocks.

The content of the acyclic non-conjugated diene unit in the unsaturated copolymer ranges from about 0.05 to about 50 mol %, preferably from 0.1 to 30 mol %, and more preferably from 0.5 to 15 mol %. If it is less than 0.05 mol %, the unsaturated group content in the copolymer is too small, making it difficult to achieve sufficient efficiency in introducing an unsaturated carboxylic acid or a derivative thereof into the copolymer (hereinafter described) to prepare carboxyl-containing olefin resin (b-1). If it exceeds 50 mol %, the rate of copolymerization is so low that a large amount of a solvent-soluble polymer which is a by-product in the case of slurry polymerization increases the viscosity of the polymerization system, resulting in a reduction in productivity. In addition, the resulting unsaturated copolymer becomes tacky or fails to maintain a resinous state.

The molecular weight of the unsaturated copolymer is not particularly limited as long as the above-mentioned resinous state is maintained. An unsaturated copolymer comprising propylene as an α-olefin unit, for example, preferably has a molecular weight to achieve a melt flow rate (MFR) of from about 0.001 to about 1000 g/10 min, preferably from 0.01 to 500 g/10 min, and more preferably from 0.05 to 100 g/10 min, as measured according to JIS K6758 (230° C., 2.16 kg). Further, this particular unsaturated copolymer preferably has a modulus of elasticity of from 500 to 80000 kg/cm$^2$ as measured according to JIS K7203 (ISO R178).

From the standpoint of molecular structure, favorable unsaturated copolymers are classified into the following types:

1) Random copolymers comprising one or more α-olefins and one or more acyclic non-conjugated dienes.
2) Block copolymers comprising (a) polymer blocks of one or more α-olefins and (b) random copolymer blocks of one or more α-olefins and one or more acyclic non-conjugated dienes (the kinds and ratio of α-olefins in blocks (a) and those in the blocks (b) may be the same or different).
3) Block copolymers comprising (a) random copolymer blocks one or more α-olefins and one or more acyclic non-conjugated dienes and (b) random copolymer blocks of one or more α-olefins and one or more acyclic non-conjugated dienes, in which at least one of the kind, number, and ratio of α-olefins and the kind, number, and ratio of acyclic non-conjugated dienes in blocks (b) differs from that in blocks (a). The terminology "block copolymer" as used herein means such a copolymer as described below. For example, a "block copolymer comprising (a) homopolymer blocks of monomer A and (b) random copolymer blocks of monomer A and monomer B" includes not only a copolymer in which "a homopolymer block of monomer A" and "a random copolymer block of monomer A and monomer B" are chemically bonded to form a structure like A . . . A—AABABAAAAB . . . but a mixed copolymer containing such a copolymer and a homopolymer of monomer A or a random copolymer of monomer A and monomer B, etc. Likewise, a "block copolymer comprising (a) polymer blocks and (b) polymer blocks" includes not only a copolymer in which polymer block (a) and polymer block (b) are chemically bonded to constitute the whole composition but also a mixed copolymer containing such a copolymer and a polymer solely comprising polymer blocks (a) or a polymer solely comprising polymer blocks (b). In other words, the terminology "block copolymer" as used herein has the same meaning as block copolymers synthesized by using a Ziegler-Natta catalyst.

Specific examples of preferred unsaturated copolymers are shown below.

(A-i) Random copolymer of propylene and 4-methyl-1,4-hexadiene
(A-ii) Random copolymer of propylene and 5-methyl-1,4-hexadiene
(A-iii) Random copolymer of propylene, 4-methyl-1,4-hexadiene, and 5-methyl-1,4-hexadiene
(A-iv) Random copolymer of propylene, ethylene, 4-methyl-1,4-hexadiene, and 5-methyl-1,4-hexadiene
(A-v) Block copolymer comprising propylene homopolymer blocks and propylene/4-methyl-1,4-hexadiene/5-methyl-1,4-hexadiene random copolymer blocks
(A-vi) Block copolymer comprising propylene homopolymer blocks and ethylene/4-methyl-1,4-hexadiene/5-methyl-1,4-hexadiene random copolymer blocks
(A-vii) Block copolymer comprising ethylene homopolymer blocks and propylene/4-methyl-1,4-hexadiene/5-methyl-1,4-hexadiene random copolymer blocks
(A-viii) Block copolymer comprising propylene/ethylene random copolymer blocks and propylene/ethylene/4-methyl-1,4-hexadiene/5-methyl-1,4-hexadiene random copolymer blocks
(A-ix) Block copolymer comprising ethylene/4-methyl-1,4-hexadiene/5-methyl-1,4-hexadiene random copolymer blocks and propylene/4-methyl-1,4-hexadiene/5-methyl-1,4-hexadiene random copolymer blocks
(A-x) Block copolymer comprising propylene/4-methyl-1,4-hexadiene/5-methyl-1,4-hexadiene random copolymer blocks and propylene/ethylene/4-methyl-1,4-hexadiene/5-methyl-1,4-hexadiene random copolymer blocks
(A-xi) Block copolymer comprising propylene/4-methyl-1,4-hexadiene/5-methyl-1,4-hexadiene random copolymer blocks, propylene/ethylene/4-methyl-1,4-hexadiene/5-methyl-1,4-hexadiene random copolymer blocks, and ethylene/4-methyl-1,4-hexadiene/5-methyl-1,4-hexadiene random copolymer blocks (A-xii) Block copolymer comprising ethylene/4-methyl-1,4-hexadiene/5-methyl-1,4-hexadiene random copolymer blocks and propylene/ethylene/4-methyl-1,4-hexadiene/5-methyl-1,4-hexadiene random copolymer blocks
(A-xiii) Random copolymer of ethylene and 1,4-hexadiene
(A-xiv) Random copolymer of ethylene and 4-methyl-1,4-hexadiene
(A-xv) Random copolymer of ethylene and 5-methyl-1,4-hexadiene
(A-xvi) Random copolymer of ethylene, 4-methyl-1,4-hexadiene, and 5-methyl-1,4-hexadiene
(A-xvii) Random copolymer of ethylene, propylene, 4-methyl-1,4-hexadiene, and 5-methyl-1,4-hexadiene
(A-xviii) Random copolymer of ethylene, butene, 4-methyl-1,4-hexadiene, and 5-methyl-1,4-hexadiene
(A-xix) Random copolymer of ethylene, 1-hexene, 4-methyl-1,4-hexadiene, and 5-methyl-1,4-hexadiene
(A-xx) Random copolymer of ethylene, 4-methyl-1-pentene, 4-methyl-1,4-hexadiene, and 5-methyl-1,4-hexadiene
(A-xxi) Block copolymer comprising ethylene homopolymer blocks and ethylene/1,4-hexadiene random copolymer blocks
(A-xxii) Block copolymer comprising ethylene homopolymer blocks and ethylene/4-methyl-1,4-hexadiene/5-methyl-1,4-hexadiene random copolymer blocks
(A-xxiii) Random copolymer of 1-butene, 4-methyl-1,4-hexadiene, and 5-methyl-1,4-hexadiene
(A-xxiv) Random copolymer of 3-methyl-1-butene, 4-methyl-1,4-hexadiene, and 5-methyl-1,4-hexadiene
(A-xxv) Random copolymer of 4-methyl-1-pentene, 4-methyl-1,4-hexadiene, and 5-methyl-1,4-hexadiene
(B-i) Random copolymer of propylene and 7-methyl-1,6-octadiene
(B-ii) Random copolymer of propylene, ethylene, and 7-methyl-1,6-octadiene (B-iii) Block copolymer comprising propylene homopolymer blocks and propylene/7-methyl-1,6-octadiene random copolymer blocks (B-iv) Block copolymer comprising propylene homopolymer blocks and ethylene/7-methyl-1,6-octadiene random copolymer blocks (B-v) Block copolymer comprising ethylene homopolymer blocks and propylene/7-methyl-1,6-octadiene random copolymer blocks (B-vi) Block copolymer comprising propylene/ethylene random copolymer blocks and propylene/ethylene/7-methyl-1,6-octadiene random copolymer blocks (B-vii) Block copolymer comprising ethylene/7-methyl-1,6-octadiene random copolymer blocks and propylene/7-methyl-1,6-octadiene random copolymer blocks (B-viii) Block copolymer comprising propylene/7-methyl-1,6-octadiene random copolymer blocks and propylene/ethylene/7-methyl-1,6-octadiene random copolymer blocks (B-ix) Block copolymer comprising ethylene/7-methyl-1,6-octadiene random copolymer blocks and propylene/ethylene/7-methyl-1,6-octadiene random copolymer blocks (B-x) Random copolymer of 3-methyl-1-butene and 7-methyl-1,6-octadiene (C-i) Random copolymer of propylene, 4-methyl-1,4-hexadiene, 5-methyl-1,4-hexadiene, and 7-methyl-1,6octadiene (C-ii) Random copolymer of ethylene, propylene, 4-methyl-1,4-hexadiene, 5-methyl-1,4-hexadiene, and 7-methyl-1,6-octadiene (C-iii) Block copolymer comprising propylene homopolymer blocks and propylene/4-methyl-1,4-hexadiene/5-methyl-1,4-hexadiene/7-methyl-1,6-octadiene random copolymer blocks From the viewpoint of availability of α-olefins and ease of preparation of copolymers, preferred unsaturated copolymers are:

(i) Random copolymer of propylene, 4-methyl-1,4-hexadiene, and 5-methyl-1,4-hexadiene (ii) Block copolymer comprising propylene homopolymer blocks and ethylene/4-methyl-1,4-hexadiene/5-methyl-1,4-hexadiene random copolymer blocks (iii) Random copolymer of ethylene, 4-methyl-1,4-hexadiene, and 5-methyl-1,4-hexadiene (iv) Random copolymer of propylene, ethylene, 4-methyl-1,4-hexadiene, and 5-methyl-1,4-hexadiene (v) Block copolymer comprising ethylene/4-methyl-1,4-hexadiene/5-methyl-1,4-hexadiene random copolymer blocks and propylene/4-methyl-1,4-hexadiene/5-methyl-1,4-hexadiene random copolymer blocks (vi) Random copolymer of propylene and 7-methyl-1,6-octadiene (vii) Block copolymer comprising propylene homopolymer blocks and ethylene/propylene/7-methyl-1,6-octadiene random copolymer blocks (viii) Block copolymer comprising propylene homopolymer blocks and propylene/7-methyl-1,6-octadiene random copolymer blocks (ix) Random copolymer of ethylene, propylene, and 7-methyl-1,6-octadiene (x) Block copolymer comprising ethylene/propylene random copolymer blocks and propylene/7-methyl-1,6-octadiene random copolymer blocks (xi) Block copolymer comprising ethylene/propylene random copolymer blocks and ethylene/propylene/7-methyl-1,6-octadiene random copolymer blocks (xii) Random copolymer of 3-methyl-1-butene and 7-methyl-1,6-octadiene Carboxyl-modified olefin resins (b-1) are prepared by radical graft polymerization of an unsaturated carboxylic acid or a derivative thereof to the above-described olefin resins by any known methods, such as a method comprising irradiating an olefin resin and an unsaturated carboxylic acid with radiation, e.g., γ-rays and electron rays; a method comprising irradiating an olefin resin with radiation and then adding an unsaturated carboxylic acid; and a method comprising graft polymerization of an olefin resin and an unsaturated carboxylic acid in a dissolved, molten or dispersed state in the presence or absence of a radical polymerization catalyst.

Useful radical polymerization catalysts include organic peroxides, e.g., benzoyl peroxide, t-butyl peroxybenzoate, dicumyl peroxide, t-butyl hydroperoxide, t-butyl peroxyacetate, diisopropyl peroxydicarbonate, 2,2-bis(t-butyl peroxy)octane, and methyl ethyl ketone peroxide; inorganic peroxides, e.g., potassium persulfide; azo compounds, e.g., α,α'-azobisisobutyronitrile; and redox catalyst systems composed of hydrogen peroxide and a ferrous salt. These radical polymerization catalysts may be used either individually or in combination of two or more thereof, being selected in relation to the polymerization method adopted.

The radical graft polymerization is usually conducted at a temperature of from 30° to 350° C., and preferably from 50° to 300° C., for a period of from 30 seconds to 50 hours, and preferably from 1 minute to 24 hours. The radical polymerization catalyst is usually used in an amount up to 100 parts by weight, and preferably up to 30 parts by weight, per 100 parts by weight of the olefin resin.

Carboxyl-containing olefin resin (b-1) preferably contains from about 0.1 to about 15% by weight, particularly from 0.3 to 10% by weight, of the carboxyl-containing monomer unit. If the carboxyl-containing monomer unit content is less than 0.1% by weight, the olefin resin has poor chemical activity and low effects in improving compatibility with the modified PPE. If it exceeds 15% by weight, the resulting resin composition are sometimes inferior in moldability or appearance.

Carboxyl-containing olefin resin (b-1) may be used in combination with an unmodified olefin resin. The mixing ratio of the unmodified olefin resin is decided according to the carboxyl group content of carboxyl-containing olefin resin (b-1) so that the mixed olefin resin should contain at least 0.1% by weight of the carboxyl-containing monomer unit.

Epoxy-containing olefin resins (b-2) which can be used in the present invention as component (B) include copolymers of an α-olefin, e.g., ethylene, propylene, butene-1, pentene-1, hexene-1,3-methylbutene-1,4-methylpentene-1, heptene-1, and octene-1, and an unsaturated monomer containing an epoxy group; and graft polymers obtained by grafting an epoxy-containing unsaturated monomer to a homo- or copolymer of the above-enumerated α-olefin(s) or the above-mentioned specific unsaturated copolymers.

Suitable epoxy-containing unsaturated monomers include glycidyl methacrylate, butylglycidyl maleate, butylglycidyl fumarate, propylglycidyl maleate, and glycidyl acrylate.

The epoxy-containing olefin copolymers may further comprise comonomers other than the above-mentioned epoxy-containing unsaturated monomers, e.g., methyl acrylate, methyl methacrylate, and vinyl acetate, in a minor proportion.

Also included in epoxy-containing olefin resins (b-2) are α-olefin homopolymers or copolymers of two or more α-olefins or mixtures thereof in which the unsaturated bond is oxidized to introduce an epoxy group. Such epoxy-containing olefin resins include those obtained by oxidizing a carbon-carbon unsaturated group present in an α-olefin by a well-known technique, for example, by using hydrogen peroxide or an organic peracid (e.g., perbenzoic acid, performic acid, peracetic acid) to thereby introduce an epoxy group. Of the above-enumerated epoxy-containing unsaturated monomers, glycidyl methacrylate is preferred, and the preferred epoxy-containing olefin resin is glycidyl methacrylate grafted propylene.

The content of the unsaturated monomer unit is in the range of from about 0.1 to about 20% by weight in the grafted olefin copolymers or in the range of from about 0.1 to about 15% by weight in the olefin copolymers. If the unsaturated monomer unit content is below the lower limit, epoxy-containing olefin resin (b-2) has poor chemical activity and low effects in improving compatibility with the modified PPE. If it exceeds the upper limit, the resulting resin composition are sometimes inferior in moldability or appearance.

Epoxy-containing olefin resin (b-2) may be used in combination with an unmodified olefin resin. The mixing ratio of the unmodified olefin resin is decided according to the epoxy group content of epoxy-containing olefin resin (b-2) so that the mixed olefin resin should contain at least 0.1% by weight of the epoxy-containing monomer unit.

Particularly preferred epoxy-containing olefin resins (b-2) are modified unsaturated copolymers prepared by introducing an epoxy group into the above-described specific unsaturated copolymer comprising an α-olefin having from 2 to 12 carbon atoms and from 0.05 to 50 mol % of an acyclic non-conjugated diene of formula (IV) recited above.

Hydroxyl-containing olefin resins (b-3) which can be used in the present invention as component (B) include modified unsaturated copolymers prepared by introducing a hydroxyl group into the above-described specific unsaturated copolymer comprising an α-olefin having from 2 to 12 carbon atoms and from 0.05 to 50 mol % of an acyclic non-conjugated diene of formula (IV) recited above.

Methods for introducing a hydroxyl group into the unsaturated copolymer are not particularly limited, and any known techniques can be adopted.

For example, hydroxyl-containing olefin resin (b-3) can be prepared by (i) modifying the unsaturated copolymer with a compound containing an ethylenically unsaturated bond and a hydroxyl group, e.g., 2-hydroxyethyl acrylate, 2-hydroxyethyl methacrylate, and 2-hydroxypropyl methacrylate, in the presence of a radical generator, e.g., organic peroxides. The content of the compound containing an ethylenically unsaturated bond and a hydroxyl group in the resulting modified unsaturated copolymer preferably ranges from about 0.01 to about 30% by weight, and more preferably from 0.1 to 10% by weight. If it is less than 0.01% by weight, the hydroxyl group content is so small that no substantial improving effects expected can be obtained. If it exceeds 30% by weight, the resulting resin compositions hardly manifest mechanical properties.

Hydroxyl-containing olefin resins (b-3) can also be prepared by (ii) conversion of the ethylenically unsaturated bond in the unsaturated copolymer by (a) oxidation with a peracid prepared from hydrogen peroxide and an organic acid (e.g., formic acid), (b) oxidation with a permanganate, etc. in the presence or absence of a phase transfer catalyst, e.g., a quaternary ammonium salt, (c) oxidation with aqueous hydrogen peroxide, a permanganate, etc. in the presence of an oxide catalyst, e.g., an oxide of osmium, ruthenium, tungsten, selenium, etc., (d) addition of a halogen (e.g., bromine), a hydrogen halide or a sulfuric acid followed by hydrolysis of the adduct, or (e) introduction of an epoxy group through various reactions followed by hydrolysis, or (iii) addition of a compound containing at least one hydroxyl group in the molecule thereof such as thiol compounds (e.g., thioglycerol and thioglycol) to the ethylenically unsaturated bond in the unsaturated copolymer.

The hydroxyl group content introduced by the methods (ii) or (iii) is preferably at least 1%, more preferably at least 5%, and most preferably at least 10%, based on the ethylenically unsaturated bonds in the unsaturated copolymer. If the hydroxyl group content in the modified unsaturated copolymer is less than 1%, no substantial improving effects can be obtained.

While these reactions are often carried out with the unsaturated copolymer being in a dissolved or molten state, the unsaturated copolymer may be reacted in a swollen state with a solvent. The solvents are usually selected from aliphatic, alicyclic or aromatic hydrocarbons, halogenated aliphatic, alicyclic or aromatic hydrocarbons, esters having 6 or more carbon atoms, ethers, ketones, carbon disulfide, and mixtures of two or more thereof. The reaction rate does not need to be 100%, and by-products may be present in the reaction product as far as the above-recited content of a hydroxyl group is substantially introduced.

Polyamide resins (b-4) which can be used in the present invention as component (B) are resins having a —CONH— bond in the polymer main chain and capable of being fused on heating. Typical examples of polyamide resins (b-4) are nylon-4, nylon-6, nylon-6,6, nylon-4,6, nylon-12, and nylon-6,10. In addition, low-crystalline or amorphous polyamides containing an aromatic diamine, an aromatic dicarboxylic acid, or a like monomer, transparent nylon, and mixtures thereof may also be used.

Particularly preferred of these polyamide resins are nylon-6,6, nylon-6, and amorphous polyamides.

Polyamide resin (b-4) preferably has an inherent viscosity of from 2.0 to 8.0 as measured at 25° C., 1 w/v % 98% concentrated sulfuric acid solution according to JIS K6810.

Saturated polyester resins (b-5) which can be used in the present invention as component (B) include various polyesters, for example, thermoplastic polyesters prepared by condensing a dicarboxylic acid or a lower alkyl ester, acid halide or acid anhydride derivative thereof with a glycol component in a usual manner.

Examples of suitable aromatic or aliphatic dicarboxylic acids to be used in the preparation of these polyesters are oxalic acid, malonic acid, succinic acid, glutaric acid, adipic acid, suberic acid, azelaic acid, sebacic acid, terephthalic acid, isophthalic acid, p,p'-dicarboxydiphenylsulfone, p-carboxyphenoxyacetic acid, p-carboxyphenoxypropionic acid, p-carboxyphenoxybutyric acid, p-carboxyphenoxyvaleric acid, 2,6-naphthalenedicarboxylic acid, and 2,7-naphthalenedicarboxylic acid, and mixtures thereof.

Examples of suitable glycol components to be used in the preparation of these polyesters include aliphatic glycols, e.g., straight chain alkylene glycols having from 2 to 12 carbon atoms, e.g., ethylene glycol, 1,3-propylene glycol, 1,4-butene glycol, 1,6-hexene glycol, and 1,12-dodecamethylene glycol; and aromatic glycols, e.g., p-xylene glycol, pyrocatechol, resorcinol, hydroquinone, and alkyl-substituted derivatives of these compounds. 1,4-Cyclohexanedimethanol is also useful as a glycol component.

Polyesters obtained by ring-open polymerization of lactones, e.g., polypivalolactone and poly(ε-caprolactone), are also preferred.

Further included in preferred polyesters are those which form liquid crystals in a molten state, called thermotropic liquid crystal polymers (TLCP). Typical commercially available polyesters included under this category are "X7G" produced by Eastman Kodak Co., "Xydar TM" produced by Dartco Co., "Econol TM" produced by Sumitomo Chemical Co., Ltd., and "Vectra TM" produced by Celanese Co.

Particularly preferred of the above-mentioned polyester resins are polyethylene terephthalate (PET), polybutylene terephthalate (PBT), polynaphthalene terephthalate (PEN), poly(1,4-cyclohexanedimethylene terephthalate) (PCT), and liquid crystal polyesters.

If desired, the thermoplastic resin composition according to the present invention may contain other additional resin components. For example, the composition may contain not more than 80% by weight of unmodified PPE represented by formula (V) defined above, unmodified olefin resins, and the like. If desired, the composition may further contain not more than 5% by weight of additives such as antioxidants, weathering agents, nucleating agents, flame retardants, plasticizers, fluidity improving agents, and so on. The composition may also contain up to 60% by weight of organic or inorganic fillers and reinforcements. In particular, addition of glass fiber, mica, talc, wollastonite, potassium titanate, calcium carbonate, or silica is effective to improve rigidity, heat resistance, and dimensional stability of the composition. To improve practical utility, known colorants and dispersing agents for colorants can also be employed.

In addition, it is effective to add from 5 to 30% by weight of impact resistance improving agents, such as a styrene-butadiene copolymer rubber and a hydrogenation product thereof, an ethylene-propylene(-diene) copolymer rubber and a modified product thereof (e.g., modified with an α,β-unsaturated carboxylic acid anhydride or an unsaturated glycidyl ester or ether), a copolymer of an unsaturated epoxy compound and ethylene, and a copolymer of an unsaturated epoxy compound, ethylene, and an ethylenically unsaturated compound. These impact resistance improving agents may be used either individually or in combination of two or more thereof.

In the thermoplastic resin compositions according to the present invention, taking the balance of thermal rigidity, moldability, impact resistance, and solvent resistance into account, the compounding ratio of hydroxyalkylated PPE (A) to component (B) selected from specific olefin resins (b-1, b-2, b-3), polyamide resins (b-4), and unsaturated polyester resins (b-5) ranges from about 90:10 to about 10:90, preferably from 80:20 to 20:80, and more preferably from 70:30 to 30:70, by weight. If component (B) is less than 10% by weight, the composition is poor in solvent resistance. If it exceeds 90% by weight, sufficient thermal rigidity cannot be obtained.

The thermoplastic resin compositions of the invention can be obtained by melt-kneading the above-described components according to kneading techniques commonly employed for general thermoplastic resins. For example, powderous or particulate components are uniformly dry blended, if desired, together with necessary additives in a Henschel mixer, a ribbon blender, a twin-cylinder mixer, etc., and the resulting blend is melt-kneaded in a single-screw extruder, a multi-screw extruder, a roll, a Banbury mixer, etc.

Methods of molding the thermoplastic resin compositions of the invention are not particularly restricted, and any of molding techniques commonly employed for thermoplastic resins, such as injection molding, blow molding, extrusion molding, thermoforming, rotational molding, laminate molding, and press molding, can be applied.

The present invention is now illustrated in greater detail with reference to Examples, but it should be understood that the present invention is not deemed to be limited thereto. All the parts and percents are by weight unless otherwise indicated.

The following resin materials were used in the Examples.

PPE:

Poly(2,6-dimethyl-1,4-phenylene ether) experimentally prepared by Nippon Polyether K.K. whose intrinsic viscosity (30° C., chloroform) was 0.31 dl/g (designated PPE[$\eta$]=0.31), 0.51 dl/g (designated PPE[$\eta$]=0.51), or 0.3 dl/g (designated PPE[$\eta$]=0.3).

Unmodified Polypropylene:

Propylene resin "Mitsubishi POLYPRO MA3" produced by Mitsubishi Petrochemical Co., Ltd. Designated as PP.

COOH-Containing Olefin Resin:

Maleic anhydride-modified propylene resin "Modic" produced by Mitsubishi Petrochemical Co., Ltd. (maleic anhydride content: 0.6%). Designated as modified PP-1.

Polyamide:

Nylon-6 "Ultramid KR4411" produced by BASF.

Elastomer:

Styrene-butadiene-styrene copolymer "Cariflex KM-65" produced (abbreviated as SBS) and hydrogenated styrene-butadiene-styrene copolymer "Kraton G-1651" (abbreviated as SEBS) both produced by Shell Chemical Co., Ltd.

Saturated Polyester: Polybutylene terephthalate "Novadul 5010" produced by Mitsubishi Kasei Corporation.

Other resin components used in Examples are shown in the following Preparation Examples.

PREPARATION EXAMPLE 1

Preparation of Hydroxyalkylated PPE (Modified PPE-1)

In 5 l of toluene, 500 g of PPE[$\eta$]=0.31 were completely dissolved at 100° C. with stirring in a nitrogen atmosphere. 75 g of sodium ethoxide as a catalyst and 500 ml of methanol were added to the resulting solution, and 250 g of glycidol were added dropwise thereto over 30 minutes. After the stirring was continued at 100° C. for 7 hours, the reaction mixture was poured into 25 l of methanol to precipitate a hydroxyalkylated PPE produced. The precipitate was collected by filtration, washed twice with methanol, and dried at 80° C. under reduced pressure.

The resulting hydroxyalkylated PPE was designated modified PPE-1. The infrared absorption spectrum of modified PPE-1 showed an absorption assigned to a hydroxyl group in the vicinity of 3380 cm$^{-1}$. The reaction rate of the terminal phenolic hydroxyl groups of the starting PPE was found to be 90% as calculated from the terminal phenolic hydroxyl group contents before and after the reaction according to the method described in *Journal of Applied Polymer Science: Applied Polymer Symposium*, Vol. 34, pp. 103–117 (1978) (hereinafter the same).

PREPARATION EXAMPLE 2

Preparation of Hydroxyalkylated PPE (Modified PPE-2)

Modified PPE-2 was prepared in the same manner as for modified PPE-1, except for replacing PPE[$\eta$]=0.31 with PPE[$\eta$]=0.51. The reaction rate of the terminal phenolic hydroxyl groups was found to be 82%.

PREPARATION EXAMPLE 3

Preparation of Hydroxyalkylated PPE (Modified PPE-3)

In 5 l of toluene, 500 g of PPE[$\eta$]=0.3 were completely dissolved at 100° C. with stirring in a nitrogen atmosphere. 75 g of sodium ethoxide as a catalyst and 500 ml of methanol were added to the resulting solution, and 250 g of glycidol were added dropwise thereto over 30 minutes. After the stirring was continued at 100° C. for 7 hours, the reaction mixture was poured into 25 l of methanol to precipitate a hydroxyalkylated PPE produced. The precipitate was collected by filtration, washed twice with methanol, and dried at 80° C. under reduced pressure.

The resulting hydroxyalkylated PPE was designated modified PPE-3. The infrared absorption spectrum of Modified PPE-3 showed an absorption assigned to a hydroxyl group in the vicinity of 3380 cm$^{-1}$. The reaction rate of the terminal phenolic hydroxyl groups was found to be 74%.

PREPARATION EXAMPLE 4

Preparation of Hydroxyalkylated PPE (Modified PPE-4)

In 10 l-volume glass flask equipped with a stirrer, 500 g of PPE[$\eta$]=0.3 and 5 l of toluene were charged followed by heating with stirring to form a PPE solution. After heating the solution up to 80° C., 12.5 g of sodium ethylate dissolved in 125 ml of ethanol were added thereto, and 250 g of 3-glycidyloxypropyltrimethoxysilane were then added thereto, followed by stirring at 100° C. for 7 hours. After completion of the reaction, the reaction mixture was poured into 25 l of acetonitrile, and the precipitated modified PPE was collected by filtration. The precipitate was again washed with 25 l of acetonitrile and dried at 80° C. under reduced pressure to obtain a hydroxyalkylated PPE (designated modified PPE-4). The reaction rate of the terminal phenolic hydroxyl group of the starting PPE was found to be 98%.

PREPARATION EXAMPLE 5

Preparation of Comparative Hydroxyalkylated PPE (Modified PPE-5)

In a 1 l-volume autoclave, 500 ml of xylene were charged, and 50 g of PPE[$\eta$]=0.3 were dissolved therein. Two grams of ethylene oxide were introduced into the solution under pressure to conduct a reaction at 150° C. for 5 hours. The reaction product was precipitated in methanol, collected by filtration, and dried to obtain 48 g of a hydroxyalkylated PPE (designated modified PPE-5). The reaction rate of the terminal phenolic hydroxyl group of the PPE was found to be 84%.

PREPARATION EXAMPLE 6

Preparation of Comparative Hydroxyalkylated PPE (Modified PPE-6)

In a 1 l-volume autoclave, 500 ml of xylene were charged, and 50 g of PPE[$\eta$]=0.3 were dissolved therein. While keeping the solution at 70° C., 2.6 g of terephthalic acid chloride were added thereto, then the mixture was allowed to react for 2 hours. Then, 2.86 g of triethylamine were added to the reaction mixture, followed by stirring for 5 hours. A solution of 6.15 g of butanediol in 25 ml of chloroform was added to the reaction mixture, then the mixture was allowed to react for 4 hours. The reaction product was precipitated in methanol to recover a hydroxyakylated PPE (designated modified PPE-6). The reaction rate of the terminal phenolic hydroxyl group of the starting PPE was found to be 95% or more.

PREPARATION EXAMPLE 7

Preparation of Carboxyl-Modified Unsaturated Copolymer (Modified UC-1)

In a 10 l-volume glass flask equipped with a stirrer whose atmosphere had been thoroughly displaced with nitrogen, 250 g of a propylene-7-methyl-1,6-octadiene copolymer (7-methyl-1,6-octadiene content: 2 mol %; crystallinity (X-ray diffractometry): 46.5%; MFR: 2 g/10 min (230° C., ASTM D1238)) and 250 g of maleic anhydride were charged, and 5 l of chlorobenzene were added thereto, followed by heating at 110° C. with stirring to form a solution. To the solution, 0.6 g of benzoyl peroxide dissolved in 500 ml of chlorobenzene were added dropwise over 2 hours. After the addition, the reaction was further continued at 110° C. for 3 hours. The reaction mixture was poured into 15 l of acetone, and the thus formed precipitate was filtered and washed. Acetone precipitation, filtration, and washing were repeated once more, and the precipitate was dried under reduced pressure to obtain a graft-modified copolymer (designated as modified UC-1). Modified UC-1 was found to have a maleic anhydride content of 4.2% by infrared spectroscopic analysis and an MFR of 2.8 g/10 min.

PREPARATION EXAMPLE 8

Preparation of Carboxyl-Modified Unsaturated Copolymer (Modified UC-2)

In a 10 l-volume glass flask equipped with a stirrer whose atmosphere had been thoroughly displaced with nitrogen, 250 g of a propylene-7-methyl-1,6-octadiene copolymer (7-methyl-1,6-octadiene content: 2.7 mol %; crystallinity (X-ray diffractometry): 45%; MFR: 1.7 g/10 min) and 250 g of maleic anhydride were charged, and 5 l of xylene were added thereto, followed by heating at 110° C. with stirring to form a solution. To the solution, 0.12 g of dicumyl peroxide dissolved in 500 ml of xylene were added dropwise over 2 hours. After the addition, the reaction was further continued at 110° C. for 3 hours. The reaction mixture was worked-up in the same manner as in Preparation Example 7 to obtain a graft-modified copolymer (designated as modified UC-2). Modified UC-2 was found to have a maleic anhydride content of 4.2% and an MFR of 0.1 g/10 min.

PREPARATION EXAMPLE 9

Preparation of Carboxyl-Containing Olefin Resin (Modified PP-2)

In a 10 l-volume glass flask equipped with a stirrer whose atmosphere had been thoroughly displaced with nitrogen, 250 g of a propylene homopolymer powder (MFR: 1 g/10 min, 230° C.) and 50 g of maleic anhydride were charged, and 5 l of xylene were added thereto, followed by heating at 110° C. with stirring to form a solution. To the solution, 25 g of dicumyl peroxide dissolved in 500 ml of xylene were added dropwise over 2 hours. After the addition, the reaction was further continued at 110° C. for 3 hours. The reaction mixture was worked-up in the same manner as in Preparation Example 7 to obtain a graft-modified propylene resin (designated modified PP-2). Modified PP-2 was found to have a maleic anhydride content of 0.67% by infrared spectroscopic analysis and an MFR of 7.7 g/10 min.

PREPARATION EXAMPLE 10

Preparation of Epoxy-Containing Olefin Resin (Modified PP-3)

Glycidyl methacrylate (GMA) was graft copolymerized to polypropylene in a xylene solvent in the presence of benzoyl peroxide as an initiator at 130° C. for 3 hours. A GMA homopolymer was removed from the reaction product by dissolution with acetone to recover a GMA grafted-propylene copolymer (designated as modified PP-3) having a GMA content of 2.3% and a weight average molecular weight of 236000.

PREPARATION EXAMPLE 11

Preparation of Epoxy-Modified Unsaturated Copolymer (Modified UC-3)

In a 10 l-volume glass flask equipped with a stirrer whose atmosphere had been thoroughly displaced with nitrogen, 250 g of a propylene-7-methyl-1,6-octadiene copolymer (7-methyl-1,6-octadiene content: 0.9 mol %; crystallinity (X-ray diffractometry): 46%; MFR: 1.5 g/10 min (230° C., ASTM D1238)) and 300 g of GMA were charged, and 5 l of chlorobenzene were added thereto, followed by heating at 110° C. with stirring to form a solution. To the solution, 25 g of benzoyl peroxide dissolved in 500 ml of chlorobenzene were added dropwise over 2 hours. After the addition, the reaction was further continued at 110° C. for 3 hours. The reaction mixture was worked-up by three repetitions of acetone precipitation, filtration and washing, and dried under reduced pressure to obtain a graft-modified unsaturated copolymer (designated as modified UC-3). Modified UC-3 was found to have a GMA content of 5.6% and an MFR of 14.3 g/10 min.

PREPARATION EXAMPLE 12

Preparation of Epoxy-Containing Olefin Resin Modified PP-4)

In a 10 l-volume glass flask equipped with a stirrer whose atmosphere had been thoroughly displaced with nitrogen, 250 g of a propylene homopolymer powder (MFR: 1 g/10 min, 230° C.) and 100 g of GMA were charged, and 5 l of chlorobenzene were added thereto, followed by heating at 110° C. with stirring to form a solution. To the solution, 25 g of benzoyl peroxide dissolved in 500 ml of chlorobenzene were added dropwise over 2 hours. After the addition, the reaction was further continued at 110° C. for 3 hours. The reaction mixture was worked-up in the same manner as in Preparation Example 11 and dried under reduced pressure to obtain a graft-modified propylene resin (designated modified PP-4). Modified PP-4 was found to have a GMA content of 0.82% by infrared spectroscopic analysis and an MFR of 14 g/10 min.

PREPARATION EXAMPLE 13

Preparation of Hydroxyl-Modified Unsaturated Copolymer (Modified UC-4)

In a 10 l-volume glass flask equipped with a stirrer whose atmosphere had been thoroughly displaced with nitrogen, 250 g of a propylene-7-methyl-1,6-octadiene copolymer (7-methyl-1,6-octadiene content: 2.7 mol %; crystallinity (X-ray diffractometry): 45%; MFR: 1.7 g/10 min (230° C., ASTM D1238)) and 75 g of 2-hydroxyethyl methacrylate were charged, and 5 l of chlorobenzene were added thereto, followed by heating at 110° C. with stirring to form a solution. To the solution, 12.5 g of benzoyl peroxide dissolved in 500 ml of chlorobenzene were added dropwise over 2 hours. After the addition, the reaction was further continued at 110° C. for 3 hours. The reaction mixture was worked-up in the same manner as in Preparation Example 11 and dried under reduced pressure to obtain a graft-modified unsaturated copolymer (designated as modified UC-4). Modified UC-4 was found to have a 2-hydroxyethyl methacrylate content of 1.2% and an MFR of 4.1 g/10 min.

PREPARATION EXAMPLE 14

Preparation of Hydroxyl-Modified Unsaturated Copolymer (Modified UC-5)

Hydroxyl-modified unsaturated copolymer, designated modified UC-5, was prepared in the same manner as in Preparation Example 13, except for changing the amount of benzoyl peroxide to 40 g. Modified UC-5 had a 2-hydroxyethyl methacrylate content of 3.2% and an MFR of 1.8 g/10 min.

EXAMPLES 1 TO 6 AND COMPARATIVE EXAMPLES 1 TO 7

Resin components shown in Table 1 below were melt-kneaded at the mixing ratio shown at 280° C. in a laboratory plastomill manufactured by Toyo Seiki Seisakusho, and the resulting compound was ground to powders. The powder compound was press molded by means of a hydraulic compression molding press manufactured by Toyo Seiki Seisakusho at 280° C. to prepare a 2 mm thick sheet. The sheet was cut to prescribed sizes to prepare specimens for measurements of various physical properties.

Physical properties and performance properties were measured and evaluated according to the following test methods. The results obtained are shown in Table 1.

1) Dispersion State:

A cut piece of the specimen was subjected to ion etching, and the diameter of dispersed particles was measured under a scanning electron micrograph "S-2400" manufactured by Hitachi, Ltd.

2) Flexural Modulus:

Measured by use of an Instron tester according to ISO R178-1974 Procedure 12 (JIS K7203).

3) Izod Impact Strength:

Unnotched Izod impact strength was measured on three thicknesses of a 2 mm thick specimen fixed with cellophane tape by use of an Izod impact tester manufactured by Toyo Seiki Seisakusho according to ISO R180-1969 (JIS K7110).

4) Organic Solvent Resistance:

Measured according to the Bergen's ¼ ellipse method (*SPE Journal*, 667 (1962)). That is, a 2 mm thick specimen was fixed to a quarter-elliptical holder (longer axis: 24 cm; shorter axis: 8 cm) and dipped in commercially available gasoline for 5 minutes. The minimum strain which caused cracks in the thus treated specimen, i.e., limiting strain, was obtained and eavaluated according to the following rating system:

Excellent . . . No crack was observed.
Good . . . Limiting strain: >1.5%
Medium . . . Limiting strain: 1.0–1.5%
Bad . . . Limiting strain: <1.0%

5) Appearance of Molded Article:

The above-prepared powder compound was injection molded at 280° C. by use of an injection molding machine "CS-183 MMX MINI MAX" manufactured by Custom Scientific Co. to prepare a 32 mm long, 6.2 mm wide and 3.2 mm thick specimen. The appearance, mainly delamination, of the specimen was observed and evaluated as follows.

Good . . . No problem for practical use
Bad . . . Unacceptable for practical use

TABLE 1

| | Ex. 1 | Ex. 2 | Ex. 3 | Ex. 4 | Ex. 5 | Ex. 6 | Comp. Ex. 1 |
|---|---|---|---|---|---|---|---|
| Composition (%): | | | | | | | |
| Modified PPE-1 | 50 | — | — | — | 25 | 50 | — |
| Modified PPE-2 | — | 50 | 70 | 30 | — | — | — |
| Modified PPE-5 | — | — | — | — | — | — | — |
| PPE[η] = 0.31 | — | — | — | — | 25 | — | 50 |
| PPE[η] = 0.51 | — | — | — | — | — | — | — |
| Modified PP-1 | 50 | 50 | 30 | 70 | 50 | 25 | — |
| Unmodified PP | — | — | — | — | — | 25 | 50 |
| Physical Properties: | | | | | | | |
| Flexural Modulus (kg/cm$^2$) | 15500 | 14100 | 16400 | 14000 | 15600 | 15500 | 14400 |
| Unnotched Izod Impact Strength (kg · cm/cm$^2$) | 7.3 | 5.4 | 4.5 | 10.7 | 6.2 | 6.4 | 5.4 |
| Organic Solvent Resistance | Good | Good | Good | Good | Good | Good | Poor |
| Dispersed Particle Diameter (μm) | 1–2 | 1–4 | 1–4 | 1–4 | 2–10 | 2–10 | ≧100 |
| Appearance of Molded Article | Good | Good | Good | Good | Good | Good | Poor |

| | Comp. Ex. 2 | Comp. Ex. 3 | Comp. Ex. 4 | Comp. Ex. 5 | Comp. Ex. 6 | Comp. Ex. 7 |
|---|---|---|---|---|---|---|
| Composition (%): | | | | | | |
| Modified PPE-1 | — | — | 50 | — | — | — |
| Modified PPE-2 | — | — | — | — | — | — |
| Modified PPE-5 | — | — | — | — | — | 50 |
| PPE[η] = 0.31 | — | 50 | — | 100 | — | — |
| PPE[η] = 0.51 | 50 | — | — | — | — | — |
| Modified PP-1 | — | 50 | — | — | — | 50 |
| Unmodified PP | 50 | — | 50 | — | 100 | — |
| Physical Properties: | | | | | | |
| Flexural Modulus (kg/cm$^2$) | 14500 | 15100 | 14400 | 19800 | 13600 | 14200 |
| Unnotched Izod Impact Strength (kg · cm/cm$^2$) | 4.4 | 4.8 | 5.1 | 4.0 | 30.0 | 4.5 |
| Organic Solvent Resistance | Poor | Poor | Poor | Poor | Good | Good |
| Dispersed Particle Diameter (μm) | ≧100 | 20–100 | ≧100 | — | — | 2–10 (partly 100) |
| Appearance of Molded Article | Poor | Poor | Poor | — | — | Poor |

EXAMPLES 7 TO 10

Resin components shown in Table 2 below were melt-kneaded at the mixing ratio shown in a 60 ml-volume plastomill manufactured by Toyo Seiki Seisakusho at 280° C. and 60 rpm for 6 minutes. The resulting resin compositions were evaluated in the same manner as in Example 1. The results obtained are shown in Table 2.

TABLE 2

| | Ex. 7 | Ex. 8 | Ex. 9 | Ex. 10 |
|---|---|---|---|---|
| Composition (%): | | | | |
| Modified UC-3 | 50 | 50 | 25 | — |
| Modified PP-4 | — | — | 25 | 50 |
| Modified PPE-3 | 50 | — | — | 50 |
| Modified PPE-4 | — | 50 | 50 | — |
| Physical Properties: | | | | |
| PPE Dispersed Particle Diameter (μm) | 2 | 10 | 10 | 30 |
| Izod Impact Strength (kg · cm/cm²) | 2.9 | 2.7 | 2.5 | 1.7 |
| Organic Solvent Resistance | Good | Good | Good | Good |

EXAMPLES 11 TO 16 AND COMPARATIVE EXAMPLES 9 TO 14

Resin components shown in Table 3 below were melt-kneaded at the mixing ratio shown at 280° C. in a laboratory plastomill manufactured by Toyo Seiki Seisakusho, and the resulting compound was ground to powders. The powder compound was press molded by means of a hydraulic compression molding press at 280° C. to prepare a 2 mm thick sheet. Physical properties of the sheet were determined in the same manner as in Example 1. The results obtained are shown in Table 3.

TABLE 3

| | Ex. 11 | Ex. 12 | Ex. 13 | Ex. 14 | Ex. 15 | Ex. 16 |
|---|---|---|---|---|---|---|
| Composition (%): | | | | | | |
| Modified PPE-1 | 50 | — | — | — | 25 | 50 |
| Modified PPE-2 | — | 50 | 70 | 30 | — | — |
| PPE[η] = 0.31 | — | — | — | — | 25 | — |
| PPE[η] = 0.51 | — | — | — | — | — | — |
| Modified PP-3 | 50 | 50 | 30 | 70 | 50 | 25 |
| Unmodified PP | — | — | — | — | — | 25 |
| Physical Properties: | | | | | | |
| Flexural Modulus (kg/cm²) | 14600 | 15300 | 16500 | 15300 | 15300 | 14600 |
| Unnotched Izod Impact Strength (kg · cm/cm²) | 8.7 | 16.2 | 6.0 | 16.2 | 15.7 | 8.0 |
| Organic Solvent Resistance | Good | Good | Good | Good | Good | Good |
| Dispersed Particle Diameter (μm) | 1–3 | 2–5 | 2–5 | 1–5 | 2–10 | 1–4 |
| Appearance of Molded Article | Good | Good | Good | Good | Good | Good |

| | Comp. 9 | Comp. 10 | Comp. 11 | Comp. 12 | Comp. 13 | Comp. 14 |
|---|---|---|---|---|---|---|
| Composition (%): | | | | | | |
| Modified PPE-1 | — | — | — | 50 | — | — |
| Modified PPE-2 | — | — | — | — | — | — |
| PPE[η] = 0.31 | 50 | — | 50 | — | 100 | — |
| PPE[η] = 0.51 | — | 50 | — | — | — | — |
| Modified PP-3 | — | — | 50 | — | — | — |
| Unmodified PP | 50 | 50 | — | 50 | — | 100 |
| Physical Properties: | | | | | | |
| Flexural Modulus (kg/cm²) | 14400 | 14500 | 16500 | 14400 | 19800 | 13600 |
| Unnotched Izod Impact Strength (kg · cm/cm²) | 5.4 | 4.4 | 6.0 | 5.1 | 4.0 | 30.0 |
| Organic Solvent Resistance | Poor | Poor | Medium | Poor | Poor | Good |
| Dispersed Particle Diameter (μm) | ≧100 | ≧100 | 20–50 | ≧100 | — | — |
| Appearance of Molded Article | Poor | Poor | Poor | Poor | — | — |

EXAMPLES 17 TO 21

Resin components shown in Table 4 below were melt-kneaded at the mixing ratio shown in a 60 ml-volume plastomill manufactured by Toyo Seiki Seisakusho at 280° C. and 60 rpm for 6 minutes. The resulting resin compositions were evaluated in the same manner as in Example 1. The results obtained are shown in Table 4.

TABLE 4

| | Ex. 17 | Ex. 18 | Ex. 19 | Ex. 20 | Ex. 21 |
|---|---|---|---|---|---|
| Composition (%): | | | | | |
| Modified UC-1 | 50 | — | 50 | — | — |
| Modified UC-2 | — | 50 | — | 50 | — |
| Modified PP-2 | — | — | — | — | 50 |
| Modified PPE-3 | 50 | 50 | — | — | 50 |
| Modified PPE-4 | — | — | 50 | 50 | — |
| Physical Properties: | | | | | |
| PPE Dispersed Particles: | | | | | |
| Diameter (μm) | 0.1–2 | 0.1–2 | 0.1–3 | 0.1–3 | 1–3 |
| Shape | Sphere | Sphere | Sphere | Sphere | Sphere |
| Izod Impact Strength (kg · cm/cm²) | 21.5 | 14.5 | 14.2 | 13.1 | 6.2 |

TABLE 4-continued

|  | Ex. 17 | Ex. 18 | Ex. 19 | Ex. 20 | Ex. 21 |
| --- | --- | --- | --- | --- | --- |
| Solvent Resistance | Good | Good | Good | Good | Good |

EXAMPLES 22 AND 23

Resin components shown in Table 5 below were melt-kneaded at the mixing ratio shown in a 60 ml-volume plastomill manufactured by Toyo Seiki Seisakusho at 280° C. and 60 rpm for 6 minutes. The resulting resin compositions were evaluated in the same manner as in Example 1. The results obtained are shown in Table 5.

TABLE 5

|  | Ex. 22 | Ex. 23 |
| --- | --- | --- |
| Composition (part): | | |
| Modified UC-4 | 50 | — |
| Modified UC-5 | — | 50 |
| Modified PPE-3 | 50 | 50 |
| Physical Properties: | | |
| PPE Dispersed Particles Diameter ($\mu$m) | 1–3 | 1–2 |
| Izod Impact Strength (kg · cm/cm$^2$) | 7.7 | 6.5 |
| Organic Solvent Resistance | Good | Good |

As demonstrated in Examples 1 to 23 in view of Comparative Examples, the thermoplastic resin compositions according to the present invention comprising a combination of (A) hydroxyalkylated PPE and (B) a carboxyl-containing olefin resin, an epoxy-containing olefin resin, or a hydroxyl-containing olefin resin exhibit finely divided dispersion and improved compatibility between these constituting resin components which are essentially incompatible with each other. As a result, these compositions undergo no delamination while retaining excellent characteristics inherent to PPE and olefin resins, i.e., high rigidity, organic solvent resistance, and mechanical strength. It is also seen that when a carboxyl-, epoxy-, or hydroxyl-modified unsaturated copolymer comprising an α-olefin having from 2 to 12 carbon atoms and an acyclic non-conjugated diene of formula (IV) is used as component (B), the dispersed particle size is further reduced, and impact resistance is greatly improved.

EXAMPLES 24 TO 30 AND COMPARATIVE EXAMPLES 15 TO 21

Resin components shown in Table 6 below were dry blended at the mixing ratio shown to prepare a powder compound weighing about 90 g. The polyamide used here had been previously dried in vacuo at 80° C. for 15 hours. The compound was melt-kneaded at 280° C. and 60 rpm in a laboratory plastomill manufactured by Toyo Seiki Seisakusho, and the resulting compound was ground to powders. The powder compound was press molded by means of a hydraulic compression molding press manufactured by Toyo Seiki Seisakusho at 280° C. to prepare a sheet of 180 mm in length, 180 mm in width and 2 mm in thickness. The sheet was cut to prepare specimens for measurements of various physical properties. The specimens were preserved in a desiccator for 2 to 6 days before testing. Physical properties were measured and evaluated according to the following test methods. The results obtained are shown in Table 6.

6) Flexural Modulus:

Flexural modulus at 23° C. and 80° C. were measured on a specimen of 25 mm in width and 80 mm in length by means of an Instron tester according to JIS K7203. Measurements at 80° C. were made after conditioning the specimen, a specimen holder, and a loading wedge in a warm-air type thermostat at 80° C.±1° C. for at least 20 minutes.

7) Izod Impact Strength:

Unnotched Izod impact strength (23° C.) was measured on three thicknesses of a 2 mm thick specimen fixed with cellophane tape by means of an Izod impact tester manufactured by Toyo Seiki Seisakusho K.K. in accordance with JIS K7110.

8) Tensile Strength:

Tensile strength at break at 23° C. was measured on a JIS No. 2 specimen by means of a tensile tester manufactured by Shimadzu Seisakusho K.K. in accordance with JIS K7113.

9) Hue:

An L value was measured by use of a differential colorimeter manufactured by Minolta Co., Ltd. in accordance with JIS Z8729.

TABLE 6

|  | Ex. 24 | Ex. 25 | Ex. 26 | Ex. 27 | Ex. 28 | Ex. 29 | Ex. 30 |
| --- | --- | --- | --- | --- | --- | --- | --- |
| Composition (%): | | | | | | | |
| Polyamide | 50 | 50 | 50 | 70 | 30 | 50 | 50 |
| Modified PPE-1 | 50 | — | 25 | — | — | — | — |
| Modified PPE-2 | — | 50 | — | 30 | 70 | 50 | 50 |
| PPE[$\eta$] = 0.31 | — | — | 25 | — | — | — | — |
| PPE[$\eta$] = 0.51 | — | — | — | — | — | — | — |
| Maleic Anhydride | — | — | — | — | — | — | — |
| Elastomer | — | — | — | — | — | SBS 15 | SEBS 15 |
| Physical Properties: | | | | | | | |
| Flexural Modulus (kg/cm$^2$) | | | | | | | |
| 23° C. | 23800 | 22000 | 21400 | 23000 | 24000 | 16100 | 15800 |
| 80° C. | 11100 | 9100 | 8500 | 4300 | 12500 | 6200 | 6100 |
| Unnotched Izod Impact Strength (kg · cm/cm$^2$) | 45.7 | 54.4 | 38.9 | 44.9 | 32.8 | >70 | >70 |
| Tensile Strength (kg/cm$^2$) | 573 | 684 | 521 | 425 | 488 | 416 | 445 |
| Hue (L Value) | 44 | 43 | 45 | 49 | 42 | 43 | 42 |
|  | Comp. | Comp. | Comp. | Comp. | Comp. | Comp. | Comp. |

TABLE 6-continued

|  | 15 | 16 | 17 | 18 | 19 | 20 | 21 |
|---|---|---|---|---|---|---|---|
| Composition (%): | | | | | | | |
| Polyamide | 50 | 50 | 70 | 30 | 50 | 50 | 50 |
| Modified PPE-1 | — | — | — | — | — | — | — |
| Modified PPE-2 | — | — | — | — | — | — | — |
| PPE[$\eta$] = 0.31 | 50 | — | — | — | 50 | — | — |
| PPE[$\eta$] = 0.51 | — | 50 | 30 | 70 | — | 50 | 50 |
| Maleic Anhydride | — | — | — | — | 2.0 | — | 1.0 |
| Elastomer | — | — | — | — | — | SEBS | SBS |
|  | | | | | | 15 | 15 |
| Physical Properties: | | | | | | | |
| Flexural Modulus (kg/cm$^2$) | | | | | | | |
| 23° C. | 20900 | 19600 | 23100 | 24000 | 21400 | 13400 | 14400 |
| 80° C. | 8900 | 8100 | 4100 | 12300 | 8700 | 5200 | 5400 |
| Unnotched Izod Impact Strength (kg · cm/cm$^2$) | 12.4 | 18.6 | 14.2 | 20.0 | 29.0 | 21.0 | 50.3 |
| Tensile Strength (kg/cm$^2$) | 310 | 320 | 263 | 252 | 440 | 218 | 315 |
| Hue (L Value) | 44 | 42 | 49 | 45 | 19 | 44 | 24 |

As can be seen from Examples 24 to 28, the thermoplastic resin compositions of the present invention comprising (A) hydroxyalkylated PPE and (B) a polyamide resin have a satisfactory hue and markedly improved mechanical strength characteristics such as impact strength as compared with Comparative Examples 15 to 19 using unmodified PPE. That is, the compositions have high elastic modulus and excellent mechanical strength characteristics of polyamide resins and PPE resins.

Comparing Examples 29 and 30 with Comparative Examples 20 and 21 in each of which an elastomer is used as an impact strength improving agent, the compositions according to the present invention prove excellent in balance of physical properties.

As described above, the hydroxyalkylated PPE exhibits greatly improved compatibility with polyamide resins and, thus, a combination of such modified PPE and a polyamide resin provides a thermoplastic resin composition which exhibits excellent heat stability characteristic of PPE and excellent moldability and solvent resistance characteristic of polyamide resins, which undergoes no reduction in mechanical strength, such as impact strength, due to a reduction in interfacial compatibility that is often observed in non-compatible polymer blends, and which has an excellent hue.

EXAMPLES 31 AND 32 AND COMPARATIVE EXAMPLES 22 TO 26

Resin components shown in Table 7 below were dry blended at the mixing ratio shown to prepare a powder compound weighing about 50 g. Polybutylene terephthalate used here as a polyester resin had been previously dried in vacuum at 100° C. for 24 hours. The compound was melt-kneaded at 280° C. and 180 rpm for 5 minutes in a laboratory plastomill manufactured by Toyo Seiki Seisakusho, and the resulting compound was ground in a grinder to powders. The powder compound was press molded by means of an injection molding machine "CS-183 MMX MINI MAX" manufactured by Custom Scientific Co. at 280° C. to prepare specimens for measurements of physical properties.

The specimens were preserved in a desiccator for 2 to 6 days before testing. Physical properties were measured and evaluated according to the following test methods. The results obtained are shown in Table 7.

10) Thermal Rigidity:

An injection molded specimen of 47 mm in length, 5.3 mm in width and 2.6 mm in thickness was prepared. Temperature dependence of storage elastic modulus (E') at a frequency of 1 Hz was determined by use of a solid analyzer "RSA2" manufactured by Rheometrics Co., and the E' value at 150° C. was obtained.

11) Solvent Resistance:

A 31.5 mm long, 6.2 mm wide and 3.2 mm thick injection-molded specimen was prepared and weighed. The specimen was soaked in toluene at 45° C. for 15 minutes. After drying in vacuo at 110° C. for 3 hours, the weight of the specimen was again measured. The weight reduction (%) was obtained from the following equation:

$$\text{Weight Reduction (\%)} = \frac{W_0 - W_S}{W_0} \times 100$$

wherein $W_0$ is a weight before soaking; and $W_S$ is a weight after soaking and drying.

Further, any change in appearance after the soaking was observed with eyes.

12) Appearance of Molded Article:

The resin composition was injection molded to prepare a 47 mm long, 5.3 mm wide and 2.6 mm thick specimen, and the appearance, mainly delamination, of the specimen was observed and evaluated as follows.

Good . . . No problem for practical use.

Medium . . . Improvement is needed.

Bad . . . Extremely poor.

13) Dispersion State:

A piece cut out of the specimen for solvent resistance evaluation was immersed in toluene at room temperature for 5 seconds to selectively dissolve PPE particles, and the diameter of dispersed particles was measured under a scanning electron micrograph "S-2400" manufactured by Hitachi, Ltd.

TABLE 7

|  | Ex. 31 | Ex. 32 | Compar. Ex. 22 | Compar. Ex. 23 | Compar. Ex. 24 | Compar. Ex. 25 | Compar. Ex. 26 |
|---|---|---|---|---|---|---|---|
| Composition (%): | | | | | | | |
| Modified PPE-1 | 50 | — | — | — | — | — | — |
| Modified PPE-2 | — | 50 | — | — | — | — | — |
| Modified PPE-6 | — | — | — | — | — | — | 50 |
| PPE[$\eta$] = 0.31 | — | — | 50 | — | 100 | — | — |
| PPE[$\eta$] = 0.51 | — | — | — | 50 | — | — | — |
| Polybutylene terephthalate | 50 | 50 | 50 | 50 | — | 100 | 50 |
| Physical Properties: | | | | | | | |
| Thermal Rigidity (dyn/cm$^2$) | $5.9 \times 10^9$ | $6.4 \times 10^9$ | $7.7 \times 10^9$ | $7.8 \times 10^9$ | $2.3 \times 10^{10}$ | $2.0 \times 10^9$ | $6.0 \times 10^9$ |
| Solvent Resistance: | | | | | | | |
| Weight Reduction (%) | 0.03 | 0.16 | 0.87 | 0.46 | 33.6 | 0.12 | 0.40 |
| Change of Appearance | No change | No change | Whitening | Whitening | Surface roughening | No change | Whitening |
| Appearance of Molded Article | Good | Good | Bad | Bad | Good | Good | Bad |
| Dispersed Particle Diameter ($\mu$m) | 0.2–0.5 | 1–2 | >50 | >50 | — | — | 5–50 |

As is apparent from the results of Examples 31 and 32 and Comparative Examples 22 to 26, use of (A) a hydroxyalkylated PPE in combination with (B) a saturated polyester resin brings about great reduction in dispersed particle size and improvement in compatibility between these components which are essentially incompatible with each other, to thereby provide a thermoplastic resin composition having excellent characteristics inherent to these components, i.e., thermal rigidity, solvent resistance, and satisfactory appearance of molded articles.

While the invention has been described in detail and with reference to specific examples thereof, it will be apparent to one skilled in the art that various changes and modifications can be made therein without departing from the spirit and scope thereof.

What is claimed is:

1. A thermoplastic resin composition comprising (A) from about 10 to about 90% by weight of a hydroxyalkylated polyphenylene ether represented by formula (I):

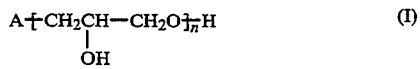

wherein n represents an integer of from 1 to 10 and A is represented by formula (III):

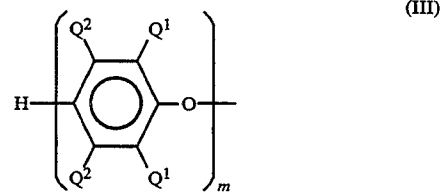

wherein $Q^1$ represents a halogen atom, a primary or secondary alkyl group, a phenyl group, an aminoalkyl group, a hydrocarbon oxy group, or a halo-hydrocarbon oxy group; $Q^2$ represents a hydrogen atom, a halogen atom, a primary or secondary alkyl group, a phenyl group, a haloalkyl group., a hydrocarbon oxy group, or a halo-hydrocarbon oxy group; and m represents an integer of 10 or greater; and (B) from about 10 to about 90% by weight of an olefin resin selected from the group consisting of a carboxyl-containing olefin resin and an epoxy-containing olefin resin.

2. A thermoplastic resin composition as claimed in claim 1, wherein said carboxyl-containing olefin resin is maleic anhydride-grafted polypropylene.

3. A thermoplastic resin composition as claimed in claim 1, wherein said epoxy-containing olefin resin is glycidyl methacrylate-grafted polypropylene.

* * * * *